United States Patent [19]

Brennan et al.

[11] 4,076,978
[45] Feb. 28, 1978

[54] FIBER OPTIC BUNDLE BEAM EXPANDER WITH IMAGE INTENSIFIER

[75] Inventors: Thomas M. Brennan, Cambridge; Robert M. Burley, Concord, both of Mass.

[73] Assignee: Baird-Atomic, Inc., Bedford, Mass.

[21] Appl. No.: 732,347

[22] Filed: Oct. 14, 1976

Related U.S. Application Data

[63] Continuation of Ser. No. 593,361, Jul. 7, 1975, abandoned, which is a continuation of Ser. No. 419,040, Nov. 26, 1973, abandoned.

[51] Int. Cl.$^2$ .................. H01J 31/50; G02B 5/16; G02B 23/08
[52] U.S. Cl. .................. 250/213 VT; 350/96.25; 350/52; 350/167; 250/227
[58] Field of Search .................. 350/96 BC, 96 B, 52, 350/301, 167, 9, 127, 128; 250/213 VT, 213 R, 227

[56] References Cited

U.S. PATENT DOCUMENTS

| 2,510,344 | 6/1950 | Law ............................. 350/167 |
| 2,800,054 | 7/1957 | Allison ......................... 350/127 |
| 2,992,587 | 7/1961 | Hicks et al. ................. 350/96 BC |
| 3,043,910 | 7/1962 | Hicks ........................... 350/96 BC |
| 3,453,035 | 7/1969 | Walther ........................ 350/9 |
| 3,907,403 | 9/1975 | Maeda .......................... 350/96 BC |

FOREIGN PATENT DOCUMENTS 1,906,360 10/1969 Germany ................. 350/96 BC

*Primary Examiner*—Jon W. Henry
*Attorney, Agent, or Firm*—Morse, Altman, Oates & Bello

[57] ABSTRACT

A tapered or twisted fiber optic bundle having a unidirectional diffuser at an output face thereof defines a fiber optic bundle beam expander. In a viewing system, such a beam expander is provided at the output of an image intensifier tube for unidirectionally spreading rays of an amplified image in a horizontal direction for biocular viewing.

5 Claims, 9 Drawing Figures

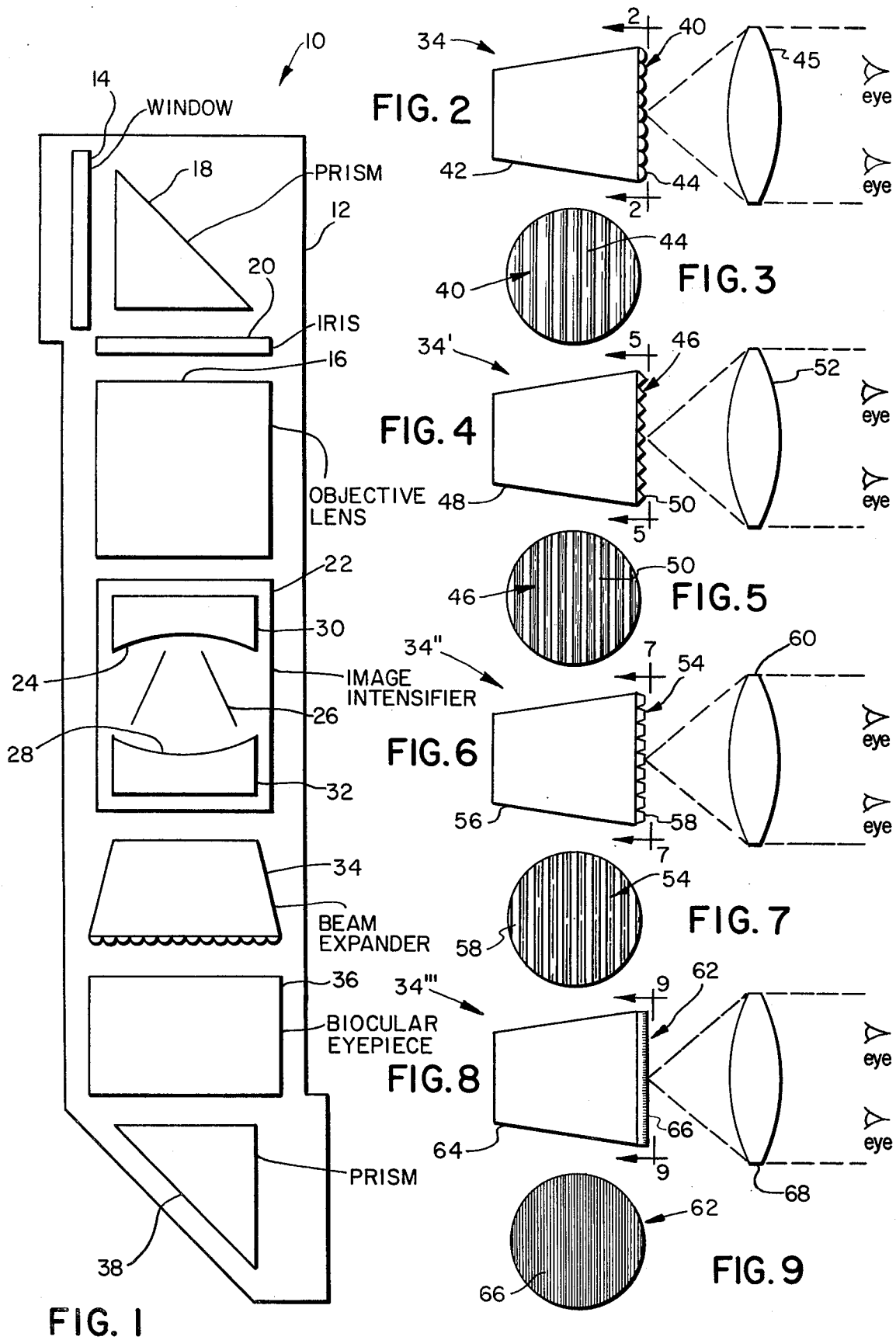

FIBER OPTIC BUNDLE BEAM EXPANDER WITH IMAGE INTENSIFIER

This is a continuation of application Ser. No. 593,361 filed on July 7, 1975 and now abandoned, which is a continuation of application Ser. No. 419,040 filed on Nov. 26, 1973 and now abandoned.

BACKGROUND OF THE INVENTION

1. Field of Invention

The present invention relates to fiber optic bundles and, more particularly, is directed towards a fiber optic bundle beam expander.

2. Description of the Prior Art

Generally, image intensifier tubes are provided with straight fiber optic bundle output sections. Generally, in viewing systems having such an image intensifier tube, a lens magnifier is used to view the image at output face of the straight fiber optic bundle. If the numerical aperture of the fiber optic output face is substantially unity, as in the case of straight fibers, and if the magnifier is made to accept a high numerical aperture, the viewing system can provide high magnification with two-eyed viewing. The requisite condition is that the fiber optic output numerical aperture be sufficient to fill the high numerical aperture of the lens which provides an exit pupil large enough to be seen with both eyes. The output numerical aperture of a twisted fiber bundle or of a tapered fiber magnifier is limited, by the nature of total internal reflection, to somewhat less than unity and is insufficient to fill the lens numerical aperture as hereinbefore noted. A random diffuser on the output of a fiber optic bundle spreads the energy through a large solid angle, portions of which can not be used by the eyes. A need has arisen for a fiber optic bundle expander for tapered and twisted fiber optic bundles which does not suffer from the heretofore mentioned disadvantages.

SUMMARY OF THE INVENTION

It is an object of the present invention to provide a biocular viewer characterized by a fiber optic bundle beam expander for unidirectionally spreading energy in the numerical aperture of tapered and twisted fiber optic bundles.

It is a further object of the present invention to provide a unidirectional diffuser characterized by a lenticular, biprism, triprism or diffraction grating film or pattern located on or at the output face of a tapered fiber optic image tube faceplate, a twisted fiber optic faceplate, or a fiber optic cathode-ray tube display. The unidirectional diffuser of the present invention provides an improvement over the heretofore mentioned prior art devices in that energy is spread in the direction in which it is used. For example, in a biocular viewing system, the energy is spread horizontally for use by both eyes.

The invention accordingly comprises the apparatus possessing the construction, combination of elements, and arrangement of parts that are exemplified in the following disclosure, the scope of which will be indicated in the appended claims.

BRIEF DESCRIPTION OF THE DRAWINGS

For a fuller understanding of the nature and objects of the present invention, reference should be had to the following detailed description, taken in conjunction with the accompanying drawings wherein:

FIG. 1 is a biocular viewing system embodying the present invention;

FIG. 2 is a schematic representation of a lenticular fiber optic bundle beam expander of FIG. 1;

FIG. 3 is a sectional view taken along the lines 3—3 of FIG. 2;

FIG. 4 is a schematic representation of a biprism fiber optic bundle beam expander depicting an alternative embodiment of the present invention;

FIG. 5 is a sectional view taken along the lines 5—5 of FIG. 4;

FIG. 6 is a schematic representation of a triprism fiber optic bundle beam expander depicting another alternative embodiment of the present invention;

FIG. 7 is a sectional view taken along the lines 7—7 of FIG. 6;

FIG. 8 is a schematic representation of a diffraction grating fiber optic bundle beam expander depicting a further alternative embodiment of the present invention; and FIG. 9 is a sectional view taken along the lines 9—9 of FIG. 8.

DETAILED DESCRIPTION OF THE INVENTION

Referring now to the drawings, particularly FIG. 1; there is shown a biocular viewing system 10 which is organized about an enclosure 12. An external window 14 is mounted at the receiving end of enclosure 12, for example a sealed housing having a substantially cylindrical profile in a periscope configuration. Rays from an object to be viewed are directed through window 14 to an objective lens 16 via a right angle prism 18 and an iris 20, the rays forming an image at the focus of objective lens 16. The rays are directed to an image intensifier tube 22 comprising a photocathode 24, an accelerator 26 and a luminescent screen 28. Photocathode 24 is mounted on the output face of a straight fiber optic bundle 30 and luminescent screen 28 is mounted on the input face of a straight fiber optic bundle 32. The rays are focused by objective lens 16 onto photocathode 24 and form an image of emitted electrons. The electrons are electrostatically or magnetically accelerated in accelerator 26 before being focused on luminescent screen 28, for example a phosphor screen. As hereinafter described in connection with FIGS. 2 and 3, an amplified image on phosphor screen 28 is spread unidirectionally by means of a fiber optic bundle beam expander 34 and is directed through a biocular eyepiece 36 and a right angle prism 38, the object to be viewed being presented at the output face of prism 38 for biocular viewing.

Referring now to FIGS. 2 and 3, it will be seen that fiber optic bundle beam expander 34 comprises a unidirectional diffuser 40 which is mounted to the image plane of a tapered fiber optic bundle 42. In one embodiment of the invention, unidirectional diffuser 40 is a lenticular film. It is to be understood that, in alternative embodiments, other than a separate lenticular film is used, for example a lenticular pattern which is ruled, ground, polished or etched into a tapered fiber optic bundle. In the illustrated embodiment, the diameter of the output face of straight fiber optic bundle 32 and the input face of tapered fiber optic bundle 42 is 25 mm, the diameter of the output face of tapered fiber optic bundle 42 is 40 mm, and the length of tapered fiber optic bundle 42 is approximately 2.25 inches. Lenticular film 40, composed of a transparent plastic material such as methylmethacrylate or polystyrene, comprises a series of elongated members 44 in spaced parallel relationship to each other, each member having a cross-sectional profile defining a lined surfaced occurring at a rate in the approximate range of 100 to 1000 cycles per inch. In the illustrated embodiment, the cross-sectional profile of each member 44 is substantially hemispherical. In alternative embodiments, the cross-sectional profile of each member 44 is parabolic, eliptical or circular or is comprised of prismatic facets. Each member 44 is disposed in a plane which is in spaced perpendicular relationship with a line drawn between the viewing eyes. Accordingly, lenticular film 40 unidirectionally spreads the energy in the numerical aperture of tapered fiber optic bundle 42 in such a manner that the rays flood both eyes or a lens with a high numerical aperture. As schematically shown in FIG. 2, an image is viewed with both eyes through biocular eyepiece 36, for example a lens 45 characterized by a fast $f$ number. Alternate embodiments of fiber optic bundle beam expander 34 are shown in FIGS. 4, 5, 6, 7, 8 and 9.

Referring now to FIGS. 4 and 5, there is shown a fiber optic bundle beam expander 34' comprising a unidirectional diffuser 46 in the form of a biprism film which is mounted to the image plane of a tapered fiber optic bundle 48. It is to be understood that, in alternative embodiments, other than a separate biprism film is used, for example, a biprism pattern which is ruled, ground, polished or etched into a tapered fiber optic bundle. The length of tapered filter optic bundle 48 is approximately 2.25 inches and the diameters of the input and output faces are 25 mm and 40 mm, respectively. Biprism film 46, composed of a transparent plastic material such as methylmethacrylate or polystyrene, comprises a series of elongated members 50 in spaced parallel relationship to each other, each member 50 having a triangular cross-sectional profile occurring at a rate in the approximate range of 100 to 1000 cycles per inch. Each member 50 is disposed in a plane which is in spaced perpendicular relationship with a line drawn between the viewing eyes. In the illustrated embodiment, the cross-sectional profile of each member 50 defines an isoceles triangle. As schematically shown in FIG. 4, an image is viewed with both eyes through a lens 52 characterized by a fast $f$ number. The operation of fiber optic bundle beam expander 34' is similar to that described in connection with fiber optic bundle beam expander 34.

Referring now to FIGS. 6 and 7, there is shown a fiber optic bundle beam expander 34" comprising a unidirectional diffuser 54 in the form of a triprism film which is mounted to the image plane of a tapered fiber optic bundle 56. It is to be understood that, in alternative embodiments, other than a separate triprism film is used, for example a triprism film which is ruled, ground, polished or etched into a tapered fiber optic bundle. The length of tapered fiber optic bundle 56 is approximately 2.25 inches and the diameters of the input and output faces are 25 mm and 40 mm, respectively. Triprism film 54, composed of a transparent plastic material such as methylmethacrylate or polystyrene, comprises a series of elongated members 58 in spaced parallel relationship to each other, each member having a trapezoidal cross-sectional profile occurring at a rate in the approximate range of 100 to 1000 cycles per inch. Each member 58 is disposed in a plane which is in spaced perpendicular relationship with a line drawn between the viewing eyes. As schematically shown in FIG. 6, an image is viewed with both eyes through a lens 60 characterized by a fast $f$ number. The operation of fiber optic bundle beam expander 34" is similar to that described in connection with fiber optic bundle beam expander 34. In an alternative embodiment, the grooves shown in FIGS. 4-7 have other than flat facets, for example curved facets, and the facet angles are varied across the surface in order to selectively direct the optical rays.

Referring now to FIGS. 8 and 9, there is shown a fiber optic bundle beam expander 34'" comprising a unidirectional diffractor in the form of a diffraction grating film 62 which is mounted to the image plane of a tapered fiber optic bundle 64. It is to be understood that, in an alternative embodiment other than a separate diffraction grating film is used, for example a diffraction grating pattern which is ruled, ground, polished or etched into a tapered fiber optic bundle. The length of tapered fiber optic bundle 64 is approximately 2.25 inches and the diameters of the input and output faces are 25 mm and 40 mm, respectively, Diffraction grating film 62, composed of a transparent plastic material such as methylmethacrylate or polystyrene, comprises a series of linear striations 66 in spaced parallel relationship to each other, the striations occurring at a rate in the approximate range of 1000 to 5000 cycles per inch. Each striation is disposed in a plane which is in spaced perpendicular relationship with a line drawn between the viewing eyes. As schematically shown in FIG. 8, an image is viewed with both eyes through a lens 68 characterized by a fast $f$ number. The operation of fiber optic bundle beam expander 34'" is similar to that described in connection with fiber optic bundle beam expander 34.

Although reference has been made to tapered fiber optic bundles, it is to be understood that, in alternative embodiments, a twisted fiber optic bundle is used in lieu of a tapered fiber optic bundle.

From the foregoing detailed description, it will be readily appreciated that the present invention provides a fiber optic bundle beam expander exemplarily shown as a lenticular, a biprism, a triprism or a diffraction grating film or pattern located at the output face of a tapered or twisted fiber optic bundle for unidirectionally spreading the energy in the numerical aperture of the fibers for biocular viewing.

Since certain changes may be made in the foregoing disclosure without departing from the scope of the invention herein involved it is intended that all matter contained in the above description and depicted in the accompanying drawings be construed in an illustrative and not in a limiting sense.

What is claimed is:

1. A biocular viewing system comprising:
 a. a sealed housing in a periscope configuration having an input section and an output section, said input section and said output section at opposite ends of said housing;
 b. a right angle prism mounted within said housing adjacent said input section;
 c. objective lens means;
 d. an iris positioned between said right angle prism and said objective lens means, rays from an object to be viewed being directed to said objective lens means through said right angle prism and said iris, said rays forming an image at the focus of said objective lens means;
 e. image intensifier means having input and output sections, an image focused on said input section by said objective lens means, an amplified image presented at said output section;

f. unidirectional fiber optic bundle beam expander means including fiber optic bundle means and unidirectional diffuser means, said fiber optic bundle means having input and output faces, said unidirectional diffuser means formed in said output face at an image plane of said fiber optic bundle means, said fiber optic bundle means having a numerical aperture that is less than unity, said amplified image at said output section being directed towards said input face and being transmitted to said output face by said unidirectional fiber optic bundle means, said unidirectional diffuser means operative to spread unidirectionally the energy in the numerical aperture of said fiber optic bundle means for biocular viewing of said image; and g. biocular eyepiece means in optical registration with said unidirectional fiber optic bundle beam expander means, said biocular eyepiece means presenting said unidirectionally spread image at said output face for biocular viewing.

2. The biocular viewing system as claimed in claim 1 wherein said unidirectional diffuser means formed in said output face is lenticular means contituted by a series of elongated members in spaced parallel relationship to each other, each said member having a cross-sectional profile defining a lined surface, said members occurring at a rate in the approximate range of 100 to 1000 cycles per inch.

3. The biocular viewing system as claimed in claim 1 wherein said unidirectional diffuser means formed in said output face is biprism means constituted by a series of elongated members in spaced parallel relationship to each other, each said elongated members having a triangular cross-sectional profile, said members occurring at a rate in the approximate range of 500 to 1000 cycles per inch.

4. The biocular viewing system as claimed in claim 1 wherein said unidirectional diffuser means formed in said output face is triprism means constituted by a series of elongated members in spaced parallel relationship to each other, each said member having a trapezoidal cross-sectional profile, said members occurring at a rate in the approximate range of 500 to 1000 cycles per inch.

5. The biocular viewing system as claimed in claim 1 wherein said unidirectional diffuser formed in said output face is a diffraction grating constituted by a series of linear striations in spaced parallel relationship to each other, said striations occurring at a rate in the approximate range of 1000 to 5000 cycles per inch.

* * * * *